(12) United States Patent
Isaacs

(10) Patent No.: US 7,178,751 B1
(45) Date of Patent: Feb. 20, 2007

(54) FISHING REEL

(75) Inventor: Gregory D. Isaacs, P.O. Box 82, Eastern, KY (US) 41622

(73) Assignees: Gregory D. Isaacs, Eastern, KY (US); David D. Newsome, Westerville, OH (US)

( * ) Notice: Subject to any disclaimer, the term of this patent is extended or adjusted under 35 U.S.C. 154(b) by 0 days.

(21) Appl. No.: 11/294,101

(22) Filed: Dec. 5, 2005

Related U.S. Application Data

(60) Provisional application No. 60/634,030, filed on Dec. 7, 2004.

(51) Int. Cl.
*A01K 89/01* (2006.01)

(52) U.S. Cl. .................. 242/231; 242/242; 242/322; 242/321

(58) Field of Classification Search ............... 242/230, 242/231, 233, 227, 242, 322, 321
See application file for complete search history.

(56) References Cited

U.S. PATENT DOCUMENTS

| | | | |
|---|---|---|---|
| 2,599,189 A | 6/1952 | Mauborgne | 242/84.1 |
| 2,715,504 A | 8/1955 | Monty | 242/84.5 |
| 2,728,535 A | 12/1955 | Young | 242/84.1 |
| 3,226,052 A | 12/1965 | King | 242/84.54 |
| 3,550,874 A | 12/1970 | Sarah | 242/84.2 |
| 4,095,756 A | 6/1978 | Morishita | 242/84.2 G |
| 4,171,108 A * | 10/1979 | Ishida et al. | 242/231 |
| 4,337,905 A | 7/1982 | Sazaki | 242/84.2 G |
| 4,426,045 A * | 1/1984 | Gifford | 242/232 |
| 4,436,254 A * | 3/1984 | Normann | 242/228 |
| 4,526,327 A | 7/1985 | Sazaki | 242/84.2 G |
| 4,577,807 A | 3/1986 | Urso | 242/84.2 C |

(Continued)

FOREIGN PATENT DOCUMENTS

DE  26 19 077  11/1977

(Continued)

*Primary Examiner*—Emmanuel M. Marcelo
(74) *Attorney, Agent, or Firm*—Standley Law Group LLP

(57) ABSTRACT

A fishing reel comprising an improved bail and/or spool system. In one example of the fishing reel, an improved bail and spool system may be adapted to facilitate casting of the fishing line. In another example of the fishing reel, an improved bail and spool system may facilitate retrieval of the fishing line. For instance, the spool may be adapted to rotate and discharge a fishing line. The spool may also be adapted to oscillate such as during retrieval of the fishing line. On the other hand, the bail may be adapted to pivot between an engaged position and a disengaged position such as for casting and retrieval of the fishing line. However, the bail may be adapted to remain stationary during rotation or oscillation of the spool (e.g., such as during casting or retrieval of the fishing line). An example of the fishing reel may also include a release assembly. For example, the bail may be adapted to engage a portion of a lock that may be positioned in a lock housing. The release assembly may include a release arm pivotally engaged with the lock and/or lock housing, wherein movement of the release arm may cause the bail to move from an engaged position to a disengaged position. Once in the disengaged position, a user may cast the line in a conventional manner and thereafter return the bail to the engaged position for line retrieval.

14 Claims, 8 Drawing Sheets

U.S. PATENT DOCUMENTS

| | | | |
|---|---|---|---|
| 4,892,267 A | 1/1990 | Webb | 242/228 |
| 4,921,188 A * | 5/1990 | Smith | 242/233 |
| 5,199,664 A | 4/1993 | Kuntze et al. | 242/228 |
| 5,342,003 A | 8/1994 | Sugawara et al. | 242/231 |
| 5,467,932 A * | 11/1995 | Puryear | 242/236 |
| 5,667,159 A * | 9/1997 | Carpenter et al. | 242/233 |
| 5,799,889 A * | 9/1998 | Plestan | 242/231 |
| 5,924,328 A | 7/1999 | Okajima et al. | 74/489 |
| 6,056,220 A * | 5/2000 | Cockerham et al. | 242/233 |
| 6,431,483 B2 * | 8/2002 | Takikura et al. | 242/322 |
| 6,634,587 B2 * | 10/2003 | Fleming | 242/255 |

FOREIGN PATENT DOCUMENTS

| | | |
|---|---|---|
| EP | 0 718 184 B1 | 7/1999 |
| GB | 2 099 671 A | 12/1982 |
| JP | 57-89471 | 6/1982 |
| WO | WO 85/02974 | 7/1985 |

\* cited by examiner

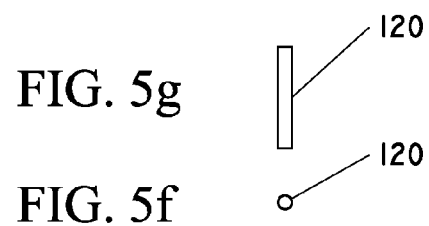
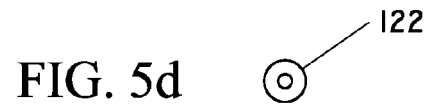
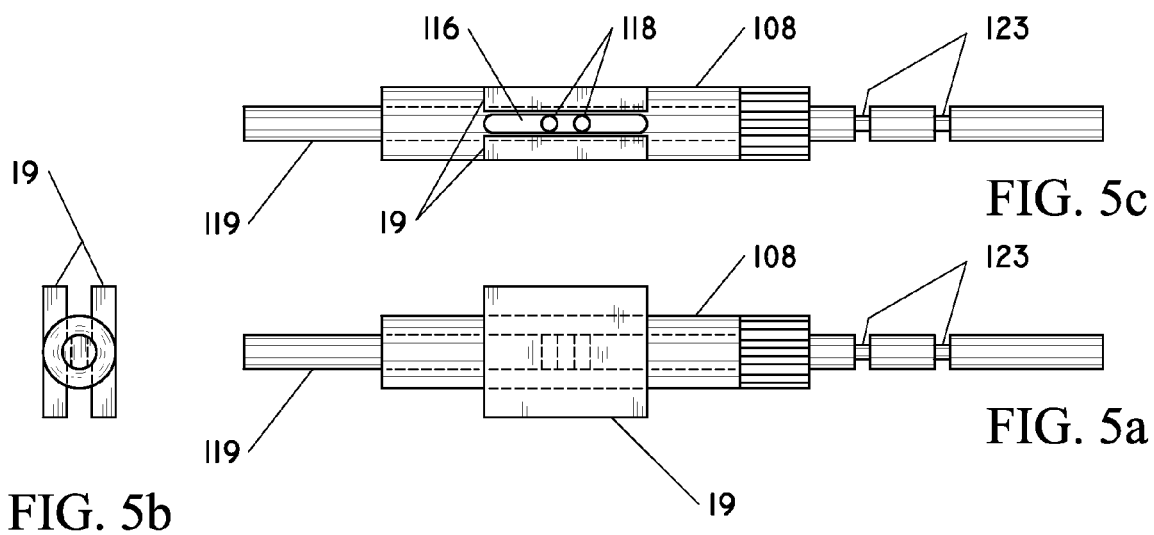

FISHING REEL

This application claims the priority benefit of U.S. Provisional Application No. 60/634,030, filed Dec. 7, 2004, which is incorporated by reference in its entirety.

TECHNICAL FIELD OF THE INVENTION

The present invention relates generally to a fishing reel.

BACKGROUND AND SUMMARY OF THE INVENTION

Recreational fishing has become one of the most popular outdoor leisure activities. One reason for the popularity is that fishing is an activity that people of all ages can enjoy. Given this interest, a myriad of devices are available to increase the pleasure of fishing. Some of the more popular products include fishing reels. From open-faced spinning reels to spool-type bait casting reels, manufacturers have developed many styles to appeal to fishermen.

Unfortunately, many of these fishing reels are difficult to operate. This requires the user to spend extensive time practicing, thereby taking away from time spent fishing. Moreover, many of these reels are difficult for those just learning to fish to operate, particularly children. This difficulty in operation often leads to frustration, which detracts from the recreational and relaxing aspects of fishing. Accordingly, the fishing arts have need for a fishing reel having a mechanism that facilitates casting of the fishing line, thereby making the reel easier to use.

In accordance with one exemplary embodiment of the present invention, a fishing reel may include an improved bail and/or spool system. In one example of the fishing reel, an improved bail and spool system may be adapted to facilitate casting of the fishing line. In another example of the fishing reel, an improved bail and spool system may facilitate retrieval of the fishing line.

In one exemplary embodiment of the present invention, a fishing reel may be comprised of a spool and a bail. The spool may be adapted to rotate and discharge a fishing line. On the other hand, the bail may be adapted to pivot between an engaged position and a disengaged position such as for casting and retrieval of the fishing line. In this example, the bail may be adapted to remain stationary during rotation of the spool (e.g., such as during casting or retrieval of the fishing line). Furthermore, in another exemplary embodiment, the spool may be adapted to oscillate such as during retrieval of the fishing line. However, similar to the previous embodiment, the bail may be adapted to remain stationary while the spool oscillates. As a result, such embodiments may facilitate the operation of the fishing reel.

In yet another exemplary embodiment of the present invention, a fishing reel may include a spool, a bail, and a release assembly. The bail may optionally include a substantially arcuate member having a recess for directing a fishing line onto the spool. The bail may also be adapted to engage a portion of a lock that may be positioned in a lock housing. The release assembly may include a release arm pivotally engaged with the lock and/or lock housing. In one example, the lock may include an aperture or recess for receiving a portion of the bail, and the lock housing may include a first spring in association with the bail and a second spring in association with the lock. In one exemplary embodiment of the present invention, movement of the release arm may cause the bail to move from an engaged position to a disengaged position. Once in the disengaged position, a user may cast the line in a manner known in the art and thereafter return the bail to the engaged position for line retrieval.

In addition to the novel features and advantages mentioned above, other features and advantages of the present invention will be readily apparent from the following descriptions of the drawings and exemplary embodiments. The drawings pertain to possible embodiments of the invention, and are merely designed to illustrate the modes best suited to carry out the invention. As it will be realized, the invention is capable of other different embodiments, and its several details are capable of modification without departing from the invention. Accordingly, the drawings and descriptions will be regarded as illustrative in nature and not as restrictive.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features.

FIG. 5a shows a side elevation view of one exemplary embodiment of a drive shaft assembly.

FIG. 5b shows an end elevation view of the drive shaft assembly of FIG. 5a.

FIG. 5c is a top plan view of the drive shaft assembly of FIG. 5a.

FIG. 5d shows a top plan view of an exemplary embodiment of a bearing of the drive shaft assembly of FIG. 5a.

FIG. 5e shows a side elevation view of the bearing of FIG. 5d.

FIG. 5f shows a top plan view of an exemplary embodiment of a pin of the drive shaft assembly of FIG. 5a.

FIG. 5g is a side elevation view of the pin of FIG. 5f.

FIG. 6b depicts a side elevation view of the connector of FIG. 6a.

FIG. 6c depicts a rear elevation view of the connector of FIG. 6a.

DETAILED DESCRIPTION OF THE EXEMPLARY EMBODIMENT(S)

Figure 1A:
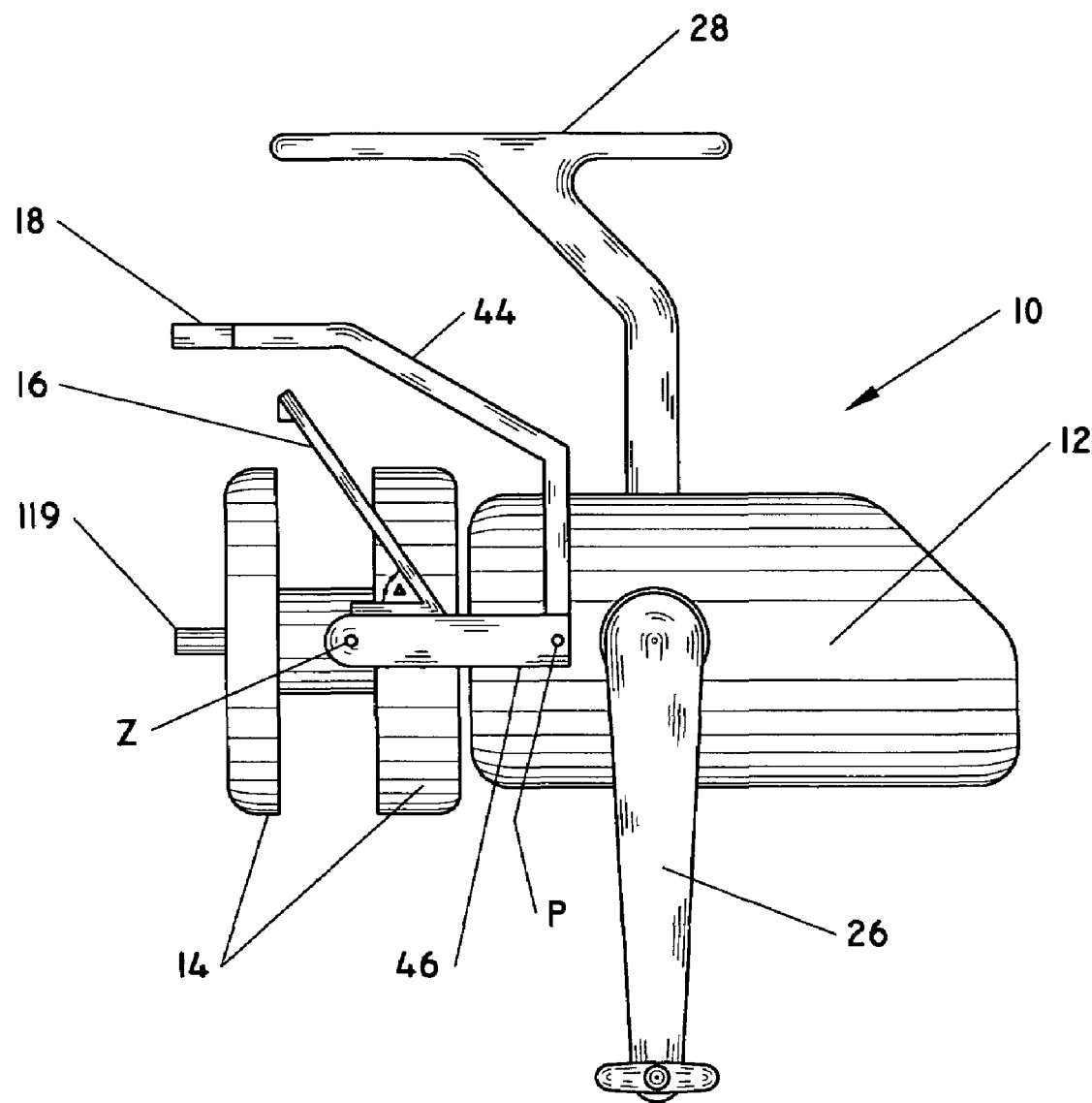
FIGS. 1a and 1b are side views of a fishing reel forming one exemplary embodiment of the present invention.
Figure 1B:
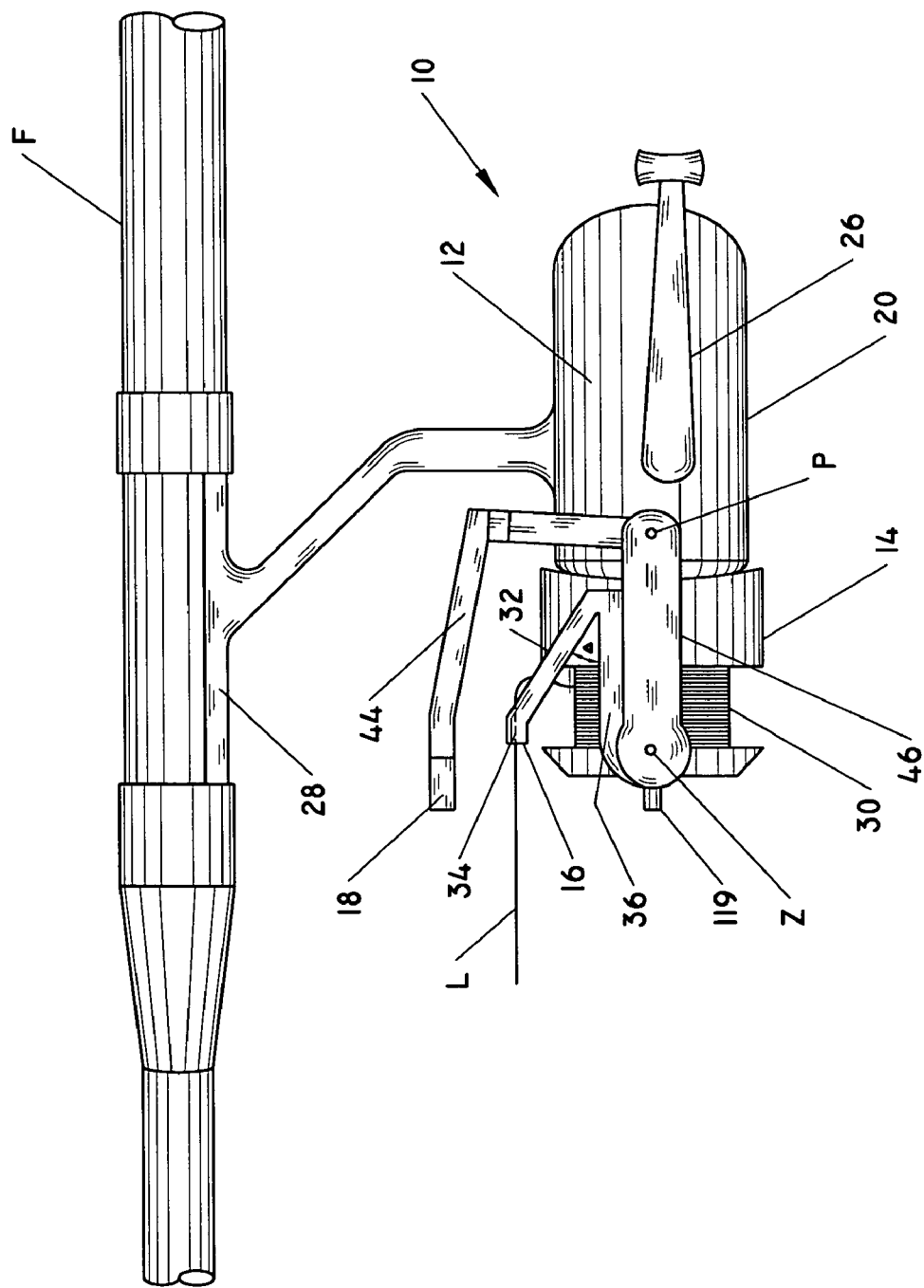
Figure 2:
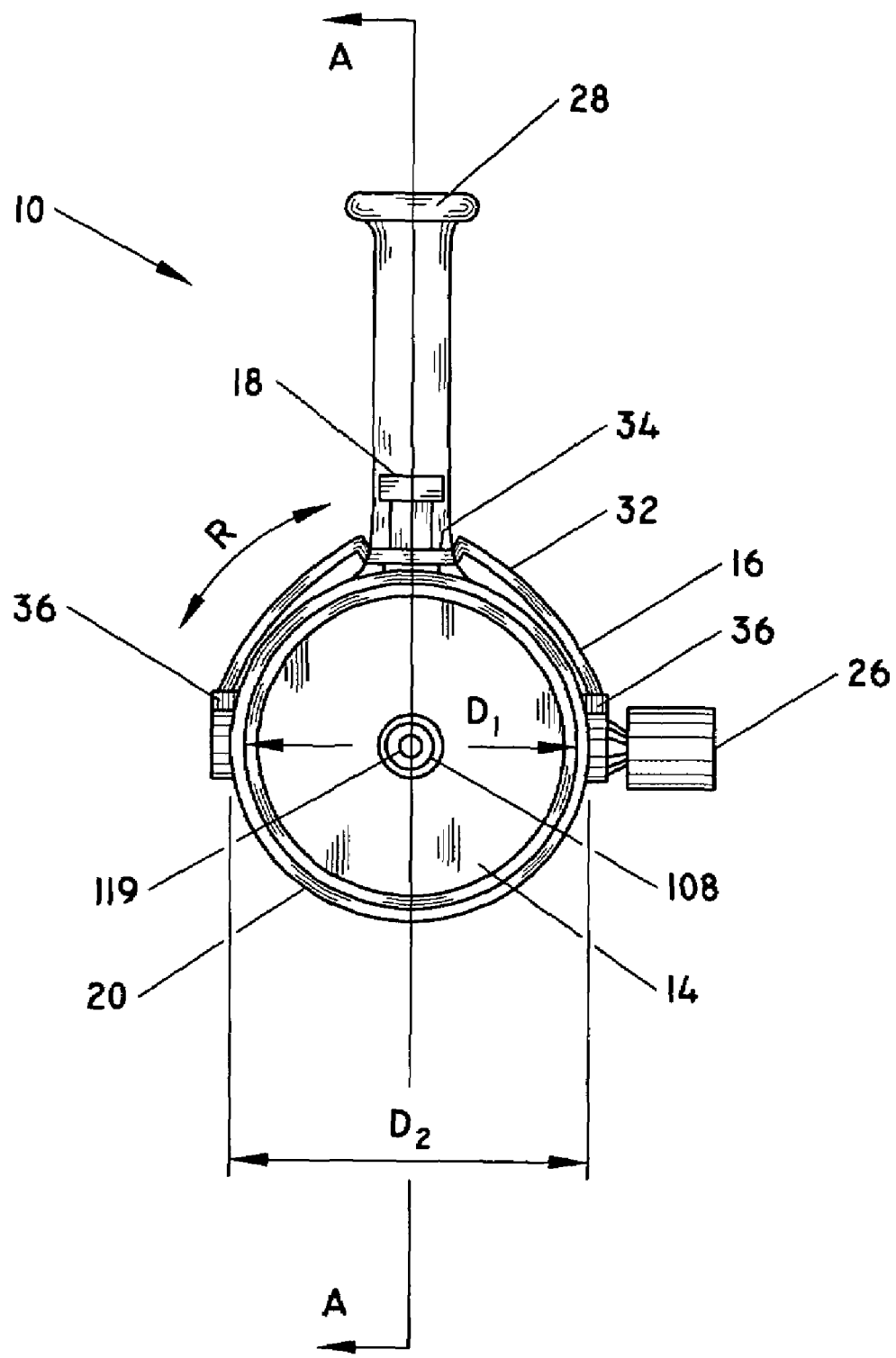
FIG. 2 is a front view of the fishing reel of FIG. 1.

FIGS. 1a, 1b, and 2 illustrate a fishing reel 10 forming one exemplary embodiment of the present invention. As shown, the reel 10 may include a body 12, a spool 14, a bail 16, and a release assembly 18. In one example, the body 12 may comprise a generally cylindrical housing 20. In other exemplary embodiments, the body may have any suitable shape. The body 12 may also include a crank, such as the handle 26, which may be in communication with a drive train that may be used to actuate spool 14. Optionally, the body 12 may also include a projection 28 adapted for attaching the body 12 to a fishing rod F.

Figure 3:
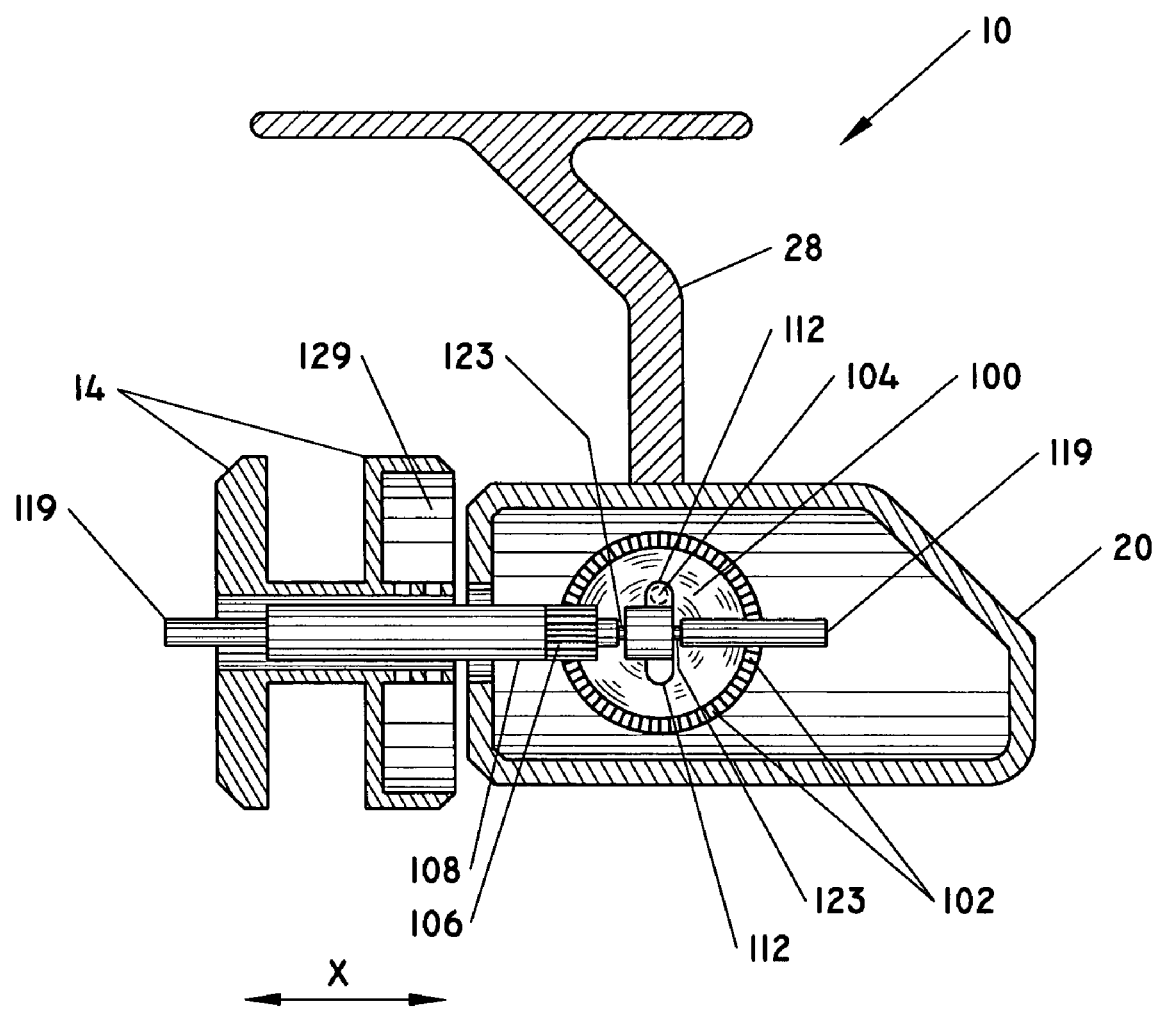
FIG. 3 is a sectional view taken along the line A—A of FIG. 2 showing one exemplary embodiment of the drive train of the present invention.

Referring to FIGS. 3, 5a–g, and 6a–c, the drive train may include any combination of gears or other devices known in the art for operating the reel 10. In one exemplary embodiment, such as shown in FIG. 3, the drive train may comprise a drive gear 100 having a plurality of teeth 102 that engage a geared portion 106 of an outer hollow shaft 108 which is coaxially and slidably aligned over an interior shaft 119. As shown in FIGS. 3 and 6a–c, a connector 112 includes an aperture or opening 127 for rotatably receiving shaft 119. Pin or projection 104, which may be fixedly attached to a drive gear 100, may slidably engage connector 112 by means of keyway 110 which is adapted to covert rotary power transmission from drive gear 100 into an oscillatory motion of inner shaft 119. Grooves 123 on inner shaft 119 may be embodied to accept snap-rings (not shown) or similar retaining rings to rotatably fix connector 112 to shaft 119. It should be noted that other suitable means of rotatably fixing connector 112 to shaft 119 known to those skilled in the art may be used.

Referring to FIGS. 5a–g, shaft 108 may include at least one slot 116 having at least one opening through which the shaft 108 may be connected to the spool 14 via insertion of pin 120. Slot 116 may expose at least one aperture or opening 188 in shaft 119. Pin 120 may be inserted in aperture 118 to connect spool 14 to shaft 108 and shaft 119, thereby facilitating rotational and oscillatory movement of spool 14. Optionally, pin 120 may accommodate at least one bearing 122 for facilitating oscillatory movement of shaft 119. A pair of offset guides 19, which may be provided in association with shaft 108 either as an integral feature or as a separate attachment or component, may be used to provide a bearing surface upon which bearing 122 may be slidably engaged, thereby permitting low friction oscillatory movement of shaft 119 within shaft 108. At least one aperture, opening, and/or exposed portion (not shown) in spool 14 may allow easy installation and removal of pin 120 within the described drive train assembly.

In operation, movement of the handle 26 causes rotation of the drive gear 100, which causes rotation of geared portion 106 and consequently shaft 108. Due to the fixed nature of the shaft 108 with the spool 14 via pin 120, spool 14 also rotates in a direction R, as shown in FIG. 2. Simultaneously, as the drive gear 100 rotates, key 104 which moves within the connector keyway 110, induces oscillatory movement of shaft 108 and the spool 14 in direction X, shown in FIG. 3, to promote an even distribution of line L upon spool 14 while retrieving line. It will be evident to those skilled in the art that the radial position of key 104 on the drive gear 100 dictates the amount of axial movement of shaft 119 and spool 14 and can be selected to promote any desired amplitude of oscillatory movement of said shaft and spool and furthermore, that additional bearings may be used as needed throughout the drive train to promote low friction and efficient transmission of power and movement between handle 26 and spool 14.

In one exemplary embodiment, shown in FIG. 1b, the spool 14 may comprise a substantially cylindrical member consisting of a receiving area 30 adapted for receiving a fishing line L. As shown in FIG. 2, the spool 14 has a diameter $D_1$ which is less than a distance $D_2$ separating connecting members 36 (discussed below). In this arrangement, the spool 14 may rotate while the connecting members 36 and bail 16 may remain stationary.

In one exemplary embodiment, shown in FIGS. 1b and 2, the bail 16 may comprise a substantially arcuate member 32 having a recess 34 for directing the fishing line L onto spool 14. In other exemplary embodiments, the bail may have any other suitable shape for directing the fishing line onto the spool. As previously mentioned, during retrieval of the line L, the spool 14 rotates. This enables a portion of the line to remain in contact with the recess 34 during retrieval and encourages easy casting of the line L, as discussed below. The recess 34 may include any configuration or dimensions for receiving a portion of the line L during retrieval of the line. In an exemplary embodiment, recess 34 is desirably centered beneath release handle 18 such that line L lies in proximity to release handle 18, thereby promoting line accessibility by the user and ease of operation during line casting.

As shown in FIGS. 1b and 2, the bail 16 may include at least one connecting member 36 attached to the ends of the arcuate member 32. A connecting member 36 and arcuate member 32 may be formed as a single piece or may be multiple pieces connected together. In one exemplary embodiment, the arcuate member 32 may be attached to a connecting member 36 such that the angle A (FIG. 1b) formed at the intersection is less than 90°. In other exemplary embodiments, any suitable angle may be formed.

Figure 4A:
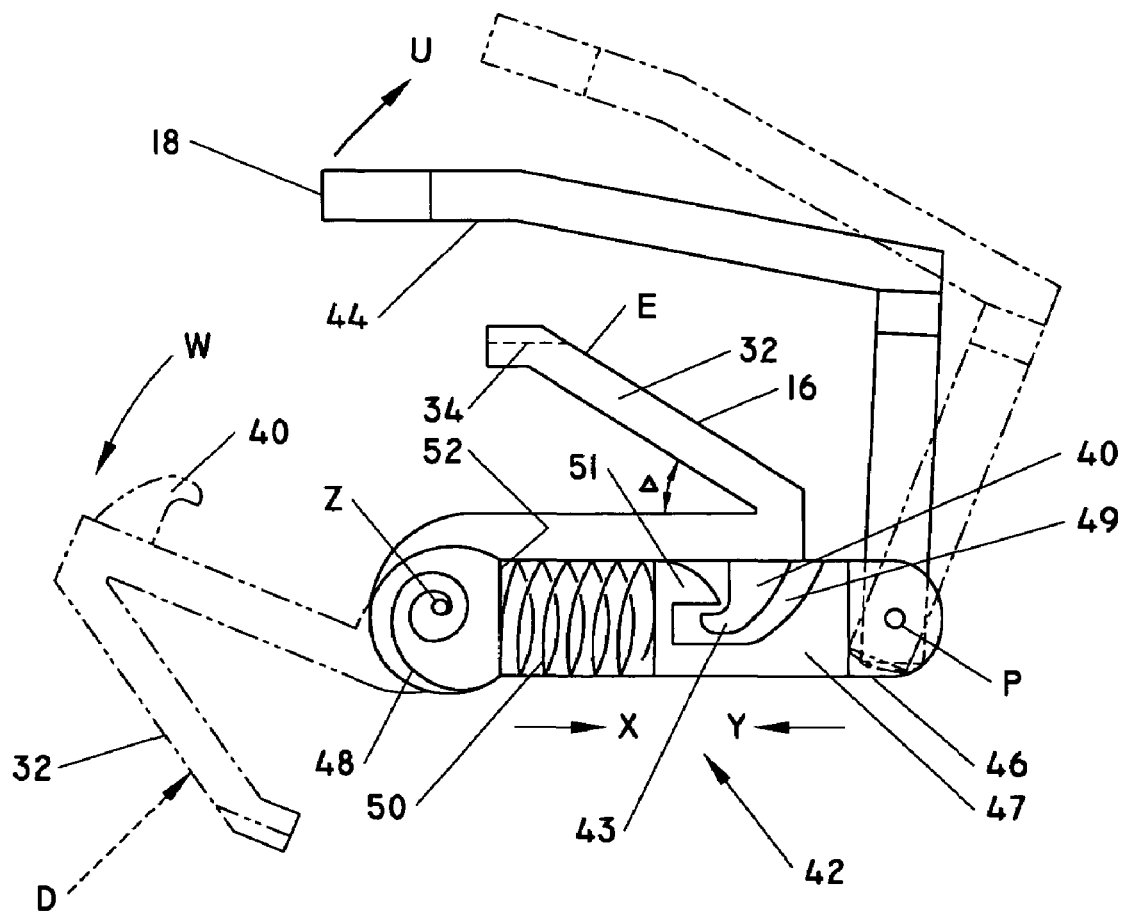
FIG. 4a is a side view showing one exemplary embodiment of a bail and release assembly of the reel depicting movement of the release lever and bail in phantom.
Figure 4B:
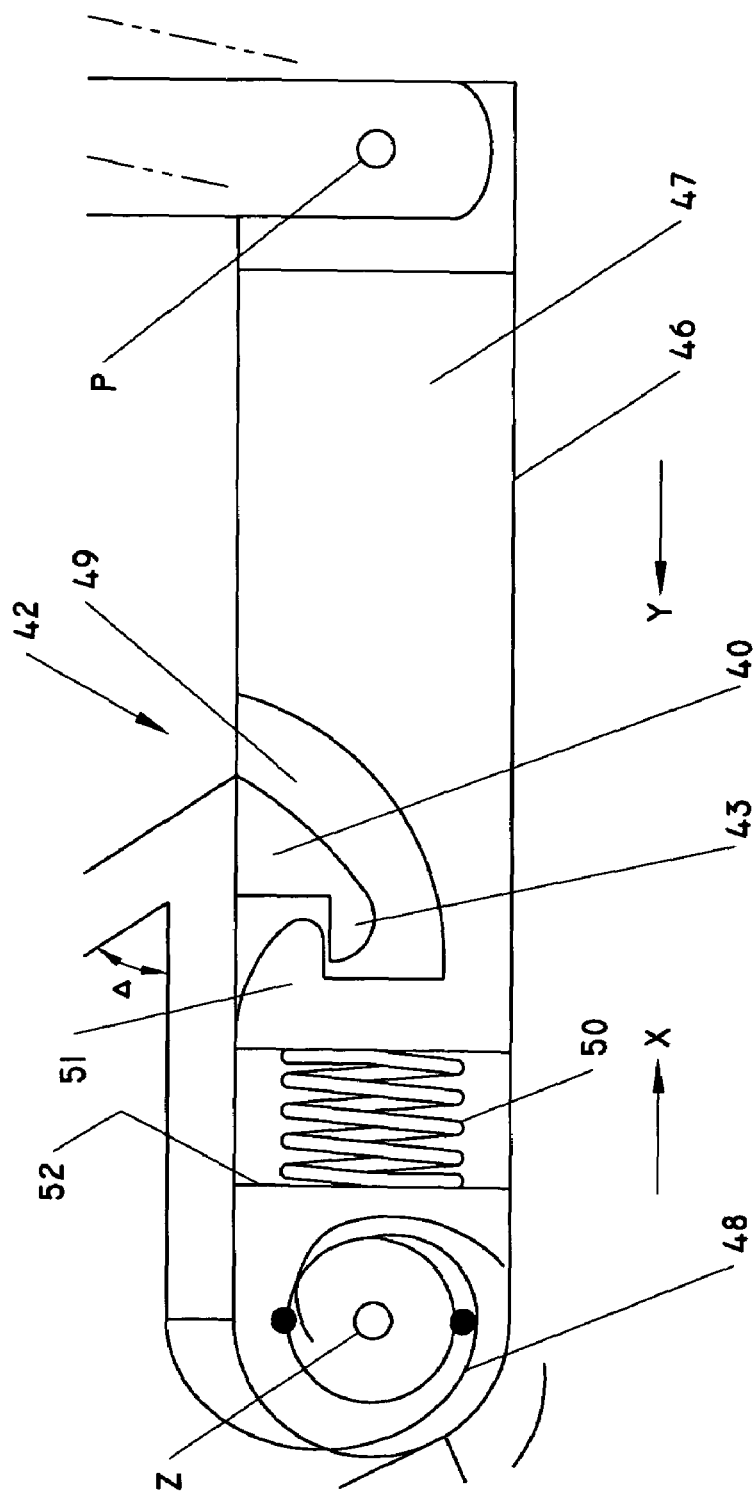
FIG. 4b is a partial detailed view of one exemplary embodiment of a lock illustrating one exemplary method of engagement of the bail to a lock.
Figure 6A:
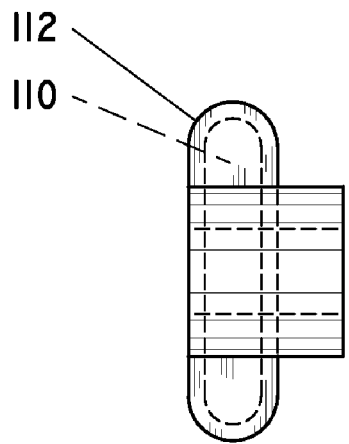
FIG. 6a depicts a front elevation view of one exemplary embodiment of a connector that may be used to induce oscillatory movement of a shaft and spool.
Figure 6B:
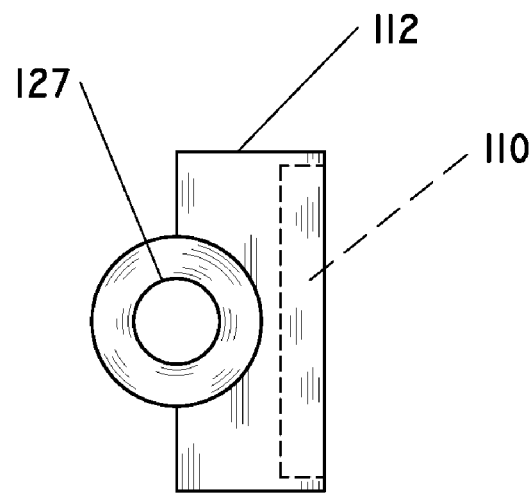
Figure 6C:
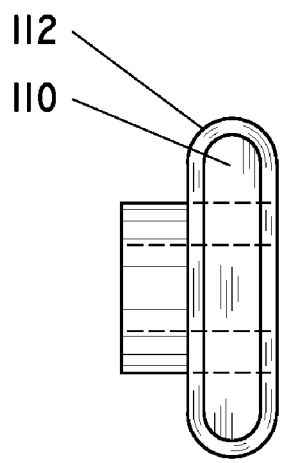

Referring now to FIGS. 4a and 4b, the connecting members 36 may include at least one depending arm 40 adapted for engaging a lock subassembly 42 of the release assembly 18. As shown, the depending arm 40 may also include a transverse member 43 adapted for engaging a portion of the lock 42. In this example, the lock 42 may comprise a substantially rectangular lock slide member 47 having a retainer, such as the recess or aperture 49. As shown, the recess 49 may include a lip 51 for engagement of the transverse member 43 of the depending arm 40 thereby retaining bail 16 in a locked configuration within lock 42. Release assembly 18 may include a release arm 44 pivotally attached at point P to the lock 42, which may be positioned in a housing 46. The housing 46 may be fixedly attached to the body 12 of the reel 10. One will appreciate that the recess 49 of the lock 42 may optionally take the form of an enlarged profile of the depending arm 40 and transverse member 43. Any other suitable shape of recess may also be used. This enables the recess 49 of the lock 42 to retain the bail 16 when placed in an engaged position. In addition to the lock 42, the housing 46 may include a first spring 48 and a second spring 50. In one exemplary embodiment, the first spring 48 may comprise a torsion spring that connects the bail 16 to the housing 46. The first spring 48 may be in association with the bail 16 or connecting member 36 by any method known in the art. The second spring 50 may comprise a compression spring positioned between a structure, such as between the lock 42 and a wall or portion 52 of the housing 46. In one example, the second spring 50 may be biased in the direction X shown in FIG. 4a.

As shown in FIG. 4a, movement of the release arm 44 in the direction U forces the lock slide member 47 within lock 42 in a direction Y, thereby compressing the second spring 50 against the wall 52 of the housing 46. This consequently disengages the depending arm 40 and transverse member 43 from lip 51 of lock slide member 47. Upon this disengagement, the rotational bias of the first spring 48 causes the bail 16 to rotate in a direction W about a point Z.

Accordingly, to use the reel 10, assuming that the bail 16 is positioned in the engaged position (the configuration shown in FIG. 1b and representatively shown as E in FIG. 4a), a user may grasp the fishing rod L and attached reel 10, and lift the line L and release arm 44 with his or her finger(s). The movement of the release arm 44 causes the bail 16 to move, as discussed above, to a disengaged position (representatively shown as D in FIG. 4*a*). At this point the line is free from engagement by the bail 16 and the user may cast the line in a manner known in the art. Upon completion of the cast, the user may close the bail 16 to the engaged position E, wherein the line engages the arcuate member 32 and recess 34. As previously discussed, the configuration of lock 42 and depending arm 40 may assist in maintaining the bail in the engaged position E. Assisted by arcuate member 32 of bail 16, the line L is directed to the recess 34 upon rotation of the spool 14. Oscillation of spool 14 while retrieving the line may promote an orderly and even distribution of line L upon the spool. Unlike conventional spinning reels, the bail 16 of the present reel 10 may remain stationary during rotation of the spool 14, and the line may engage the recess 34 when the bail is in the engaged position E. Consequently, the user does not have to adjust the position of the bail or take other action when casting. A skilled artisan will appreciate that the reel 10 may facilitate a "one-handed" casting technique.

The components of the reel 10 may be fabricated from any well-known types of materials, with a polymer, such as high-density polyethylene being preferred for at least the body 12. The bail 16 and spool 14 may be made from a metallic material, such as stainless steel. These materials have good corrosion properties and provide the reel 10 with a high-quality appearance. Drive train components may be fabricated from metals, such as brass or alloys of steel, but may also be fabricated from non-metallic composites or plastics. Reel 10 may also include a line drag system (not shown) as known in the art.

The foregoing descriptions of various embodiments of the invention are provided for purposes of illustration, and are not intended to be exhaustive or limiting. Modifications or variations are also possible in light of the above teachings. For example, the reel 10 may include any number of connecting members 36 and housings 46. Furthermore, induction of oscillatory movement of spool 14 may also be accomplished by means of a worm gear comprising a continuous groove mounted onto shaft 119 and a groove follower stationarily embodied within housing 20.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A fishing reel comprising:
    a spool adapted to rotate and discharge a line, said spool further adapted to oscillate substantially along a rotational axis of said spool;
    a bail adapted to pivot between an engaged position and a disengaged position;
    a drive gear adapted to induce rotation of said spool, said drive gear further adapted to induce oscillatory movement of said spool substantially along said rotational axis of said spool; and
    a set of inner and outer coaxial shafts in association with said drive gear and said spool;
    wherein said bail is adapted to remain stationary during rotation of said spool; and
    wherein said inner shaft is adapted to facilitate oscillation of said spool substantially along said rotational axis of said spool and said outer shaft is adapted to facilitate rotation of said spool.

2. The fishing reel of claim 1 wherein a rotational axis of said spool is approximately parallel to the discharge direction of the line.

3. The fishing reel of claim 1 wherein said bail is comprised of a substantially arcuate member having a recess adapted to direct the line onto said spool during retrieval of the line.

4. The fishing reel of claim 1 wherein:
    said outer shaft includes a geared portion;
    wherein said drive gear is adapted to engage said geared portion of said outer shaft to induce rotation of said spool.

5. The fishing reel of claim 1 wherein:
    said outer shaft comprises a slot; and
    said inner shaft comprises an opening adapted to accommodate the insertion of a pin;
    wherein said opening is exposed by said slot.

6. The fishing reel of claim 5 further comprising a pin inserted through said slot and in said opening.

7. The fishing reel of claim 6 further comprising a bearing in association with said pin, said bearing adapted to facilitate desired oscillatory movement of said inner shaft within said outer shaft.

8. The fishing reel of claim 7 further comprising at least one offset guide in association with said outer shaft, said at least one offset guide adapted to slidably engage said bearing.

9. The fishing reel of claim 1 further comprising a connector in association with said drive gear, said connector comprising an opening adapted to rotatably receive said inner shaft.

10. The fishing reel of claim 9 wherein said connector includes a keyway adapted to slidably engage a projection of said drive gear to facilitate oscillatory movement of said spool.

11. A fishing reel comprising:
    a spool adapted to oscillate during retrieval of a line;
    a bail adapted to pivot between an engaged position and a disengaged position, said bail further adapted to remain stationary during oscillation of said spool;
    a drive gear adapted to induce oscillatory movement of said spool;
    a shaft in association with said drive gear and said spool, said shaft adapted to facilitate oscillation of said spool; and
    a connector in association with said drive gear, said connector comprising an opening adapted to rotatable receive said shaft, said connector including a keyway adapted to slidably engage a projection of said drive gear to facilitate oscillatory movement of said spool.

12. The fishing reel of claim 11 wherein oscillatory movement of said spool is adapted to facilitate the distribution of the line on the spool.

13. A fishing reel comprising:

a spool adapted to oscillate during retrieval of a line, said spool further adapted to discharge a line;

a bail adapted to pivot between an engaged position and a disengaged position, said bail further adapted to remain stationary during oscillation of said spool;

a drive gear adapted to induce oscillatory movement of said spool;

a shaft in association with said drive gear and said spool, said shaft adapted to facilitate oscillation of said spool;

a connector in association with said drive gear, said connector comprising an opening adapted to rotatable receive said shaft, said connector including a keyway adapted to slidably engage a projection of said drive gear to facilitate oscillatory movement of said spool;

a lock in association with a lock housing, said lock adapted to engage said bail in said engaged position, said lock housing including a first spring in association with said bail and a second spring in association with said lock; and a release assembly in association with said bail, said release assembly comprising a release arm pivotally engaged with said lock housing;

wherein movement of said release arm is adapted to cause said bail to move from said engaged position to said disengaged position to facilitate casting of the line.

14. The fishing reel of claim 13 wherein:

said bail is biased by said first spring to move to said disengaged position; and said lock is biased by said second spring to facilitate engagement with said bail in said engaged position.

\* \* \* \* \*

UNITED STATES PATENT AND TRADEMARK OFFICE
CERTIFICATE OF CORRECTION

| | | |
|---|---|---|
| PATENT NO. | : 7,178,751 B1 | Page 1 of 1 |
| APPLICATION NO. | : 11/294101 | |
| DATED | : February 20, 2007 | |
| INVENTOR(S) | : Isaacs | |

It is certified that error appears in the above-identified patent and that said Letters Patent is hereby corrected as shown below:

In column 4, line 23, please delete "angle A" and insert -- angle $\Delta$ --.

In column 6, line 61, please delete "rotatable" and insert -- rotatably --.

In column 7, line 12, please delete "rotatable" and insert -- rotatably --.

Signed and Sealed this

Tenth Day of April, 2007

JON W. DUDAS
*Director of the United States Patent and Trademark Office*